United States Patent Office 2,907,693
Patented Oct. 6, 1959

2,907,693

ANTIBACTERIAL COMPOSITIONS COMPRISING A TETRACYCLINE-TYPE ANTIBIOTIC AND AN ALKYL PHENOXYETHOXYETHYL DIALKYL-BENZYL AMMONIUM SALT

Kenneth E. Price and Herbert G. Luther, Terre Haute, Ind., assignors to Chas. Pfizer & Co., Inc., Brooklyn, N.Y., a corporation of Delaware No Drawing. Application April 30, 1956
Serial No. 581,381

4 Claims. (Cl. 167—65)

This invention is concerned with compositions which are highly effective as antibacterial agents, disinfecting agents or therapeutic agents in combatting a variety of pathogenic organisms. In particular, it has been found that compositions of the broad spectrum tetracycline type antibiotics; that is, oxytetracycline (registered trademark Terramycin), chlortetracycline (trademark Aureomycin), tetracycline (registered trademark Tetracyn) or other related compounds, when used in conjunction with certain quaternary ammonium compounds, exert a highly valuable coaction against a variety of pathogenic microorganisms and also are useful as animal feed supplements.

The specific quternary ammonium compounds which have been found useful in the compositions of this invention are long chain alkyl phenoxyethoxyethyl dialkylbenzyl ammonium halides. However, other salts than the halides may be used for this purpose. These include salts with a variety of inorganic and organic acids, such as the phosphates, the acetates, the citrates, the tartrates, the sulfates, the maleates and so forth. A variety of the quaternary ammonium compounds are available commercially in pure form or as concentrates. In these compounds the long chain alkyl group attached to the phenoxy substituent is preferably a hydrocarbon alkyl group having between four and twelve carbon atoms; that is, butyl, hexyl, octyl, and so forth. The alkyl groups on the nitrogen are hydrocarbon alkyl groups of one to three carbons.

As noted above, oxytetracycline, tetracycline, chlortetracycline or another structurally related antibiotic is used in the present compositions together with the selected quaternary ammonium compound. The antibiotic may be used in the form of the amphoteric compound or in the form of various salts with strong acids, such as the hydrochloride or sulfate. Metallic salts (e.g. the calcium salts, the magnesium salts, zinc salts, etc.) are also useful, although it is desirable to use one that is not of too low a solubility in water. The antibiotic may be used in pure crystalline form or as partially purified concentrates or in crude form. It is, of course, essential that sufficient purification be effected so that any highly toxic impurities present in fermentation materials with the antibiotic are removed.

In general, in the compositions of the present invention from about 0.1 to about 10 parts by weight of the antibiotic (as the pure antibiotic in any of the forms indicated above) is utilized for each part by weight of the quaternary ammonium compound (on a 100% quaternary ammonium compound basis). Preferred compositions contain the two active ingredients in approximately equal weights. It should be noted that more than one of the antibiotics mentioned above may be utilized in any one of the compositions together with one or more of the preferred quaternary ammonium type compounds.

The compositions of the present invention may be incorporated into animal feeds containing the usual nutrient materials, such as grains, protein sources, carbohydrates, vitamins and minerals. The incorporation of the compositions of the present invention in animal feeds is highly effective in stimulating growth, that is, insuring maximum growth of the animals so fed and in insuring a high level of health in these animals. The antibacterial activity of the compositions is particularly efficient in preventing contraction of dangerous diseases by the animals through organisms ingested in food or water. The compositions of this invention have been found to exert their effectiveness over a prolonged period of time, a period appreciably longer than the effective antibacterial period of either the antibiotic or the quaternary ammonium compound included in the composition, when incorporated in a feed or in animal drinking water. Drinking water provided to animals in troughs or in other similar devices often becomes grossly contaminated with enteric organisms which tend to spread disease throughout a group of animals. The compositions of this invention are particularly effective when used at levels of from about 2 to about 200 parts per million in solid or liquid feeds or in drinking water. In general, the upper part of the range is preferred when the product is to be administered in drinking water and the lower part when in feed. The compositions may be incorporated in the form of powders into mixed feeds or may be blended into concentrates containing vitamins, minerals and other materials which concentrates are then added to the feed. Alternatively, the product in powder form or as tablets, effervescent powders or effervescent tablets (to assist in dispersal throughout the liquid) may be added directly to the drinking water. A unit dosage in tablet form is particularly useful since it can be prepared in a size which is suitable for the addition to a standard volume of water. Various acceptable carriers and binders may be utilized in the preparation of such tablets. These must, of course, be of reasonably low toxicity and not deleterious to the activity of the antibiotic or quaternary ammonium compound. It is a relatively easy matter to select suitable materials and prepare these products by standard methods. Among the inert materials which may be utilized for this purpose are various starches and sugars (e.g. talc, sucrose, lactose, corn starch, potato starch, wheat starch, etc.). Vegetable gums and synthetic materials may be used as binding agents in the preparation of the tablets. These include gum arabic, gum tragacanth, polyvinylpyrrolidone, etc.

The following examples are given by way of illustration and are not to be regarded as a limitation of this invention, many variations of which are possible without departing from its spirit or scope.

*Example I*

Two compositions were prepared by blending together (a) equal parts of Terramycin hydrochloride and ditertiary octyl phenoxyethoxyethyl dimethylbenzyl ammonium chloride and (b) one part by weight of the same quaternary compound with two parts by weight of Terramycin hydrochloride. A sample of drinking water grossly contaminated with enteric organisms from chickens was treated with the above quaternary ammonium compound alone at two different concentrations, with Terramycin hydrochloride alone and with the two compositions prepared as indicated above. At 24 and 48 hour intervals portions were removed from the treated water samples and from a sample of the untreated contaminated water. A bacteria count was made on each of these samples by a standard method and in the table given below are summarized the average log bacteria counts of the various water samples at 24 and 48 hours after treatment was started.

| Treatment | 0 hours | 24 hours | 48 hours |
|---|---|---|---|
| Control | 8.30 | 10.45 | 14.88 |
| 50 p.p.m. H[1] | 7.90 | 8.54 | 11.74 |
| 100 p.p.m. H | 8.00 | 8.00 | 10.52 |
| 100 p.p.m. T[2] | 7.50 | 9.44 | 12.78 |
| 50 p.p.m. H + 100 p.p.m. T | 8.35 | 7.69 | 10.53 |
| 100 p.p.m. H + 100 p.p.m. T | 8.15 | 6.31 | 8.27 |

[1] Ditertiary octyl phenoxyethoxyethyl dimethylbenzyl ammonium chloride.
[2] Terramycin hydrochloride.

It is apparent from the above table that compositions of the above quaternary compound and Terramycin are highly effective in suppressing and maintaining control over the microorganisms in the grossly contaminated animal drinking water as described above. Furthermore, these compositions are useful for stimulating the growth and a high level of health in the animals receiving the compositions in their feed or drinking water.

*Example II*

The above procedure was repeated utilizing a composition containing two parts by weight of amphoteric Terramycin and three parts by weight of p-butyl phenoxyethoxyethyl diethylbenzyl ammonium bromide as the quaternary compound. It was found that these compositions were also highly effective in suppressing contamination of animal drinking water by deleterious organisms.

*Example III*

A mixture of three parts by weight of amphoteric tetracycline and five parts by weight of p-hexyl phenoxyethoxyethyl dipropyl benzyl ammonium chloride was prepared. After thorough blending, this mixture was combined with a mixed animal feed containing grains, minerals, vitamins, and some soybean meal as a source of protein. The antibiotic-quaternary salt mixture was added to the mixed feed at a level of approximately 30 parts per million of feed. The feed was found to be highly effective in stimulating the growth of animals to which it was fed and also assuring a high level of health in these animals.

What is claimed is:

1. A bactericidal composition which comprises a substantially pure tetracycline-type antibiotic and a long chain alkyl phenoxyethoxyethyl dialkylbenzyl ammonium salt in the proportions of from about 0.1 to about 10 parts by weight of the antibiotic per part by weight of the quaternary ammonium compound.

2. A composition as claimed in claim 1 wherein the quaternary ammonium compound is ditertiary butyl phenoxyethoxyethyl dimethylbenzyl ammonium chloride.

3. A process for decreasing the bacterial contamination of water fed to animals which comprises adding thereto a composition of a substantially pure tetracycline-type antibiotic and a long chain alkyl phenoxyethoxyethyl dialkylbenzyl ammonium halide in the proportions of from about 0.1 to about 10 parts by weight of the antibiotic per part by weight of the quaternary ammonium compound.

4. A process for minimizing bacterial diseases in animals which comprises orally administering to the animals a composition of a substantially pure tetracycline-type antibiotic and a long chain alkyl phenoxyethoxyethyl dialkylbenzyl ammonium salt in the proportions of from about 0.1 to about 10 parts by weight of the antibiotic per part by weight of the quaternary ammonium compound.

References Cited in the file of this patent

UNITED STATES PATENTS

| 2,734,018 | Minieri | Feb. 7, 1956 |
| 2,753,266 | Ott | July 3, 1956 |

FOREIGN PATENTS

| 506,950 | Belgium | Nov. 30, 1951 |

OTHER REFERENCES

C. and E.N. (Chem. and Eng. News), November 22, 1954, pp. 4640–4642, 4717.

Wash. Post, "Antibiotic 'Miracle Drugs,' Prove Aid in Fattening Pigs," September 4, 1951, p. 7.

Hyamines, Rohm and Haas Co., 1947, 16 p. brochure, esp. at pp. 3, 10 (8th par.) and 13 (1st col.).

Semets: Modern Drugs, January 1954, p. 742.